Dec. 16, 1952 P. FERRERO ET AL 2,622,099
PROCESS OF PREPARING ALKANOLAMINES
Filed Sept. 10, 1948

INVENTORS
PAUL FERRERO, FRANÇOIS BERBÉ, LÉON RENÉ FLAMME
ATTORNEYS

UNITED STATES PATENT OFFICE 2,622,099

PROCESS OF PREPARING ALKANOLAMINES

Paul Ferrero, Tertre, and François Berbé and Leon René Flamme, Saint Ghislain, Belgium, assignors to "Societe Carbochimique, Société Anonyme," Brussels, Belgium, a Belgian company Application September 10, 1948, Serial No. 48,744
In Belgium September 12, 1947

6 Claims. (Cl. 260—584)

It is known that the reactions between olefine oxides and ammonia in aqueous solution lead to the mixtures of primary, secondary and tertiary amines. It is further known that the composition of the mixture of these amines depends on the relative proportions of the reactants—olefine oxide and ammonia—employed.

The reaction of ethylene oxide for example with ammonia takes place along the following lines:

$$NH_3 + C_2H_4O \rightarrow NH_2CH_2CH_2OH$$
$$NH_2CH_2CH_2OH + C_2H_4O \rightarrow NH(CH_2CH_2OH)_2$$
$$NH(CH_2CH_2OH)_2 + C_2H_4O \rightarrow N(CH_2CH_2OH)_3$$
$$N(CH_2CH_2OH)_3 + C_2H_4O \rightarrow$$
$$(CH_2CH_2OH)_2N(CH_2CH_2OCH_2CH_2OH) \ldots$$

that is a succession of stepped complete reactions of oxyethylation of ammonia, of mono-, di- and triethanolamine.

Figure 1:
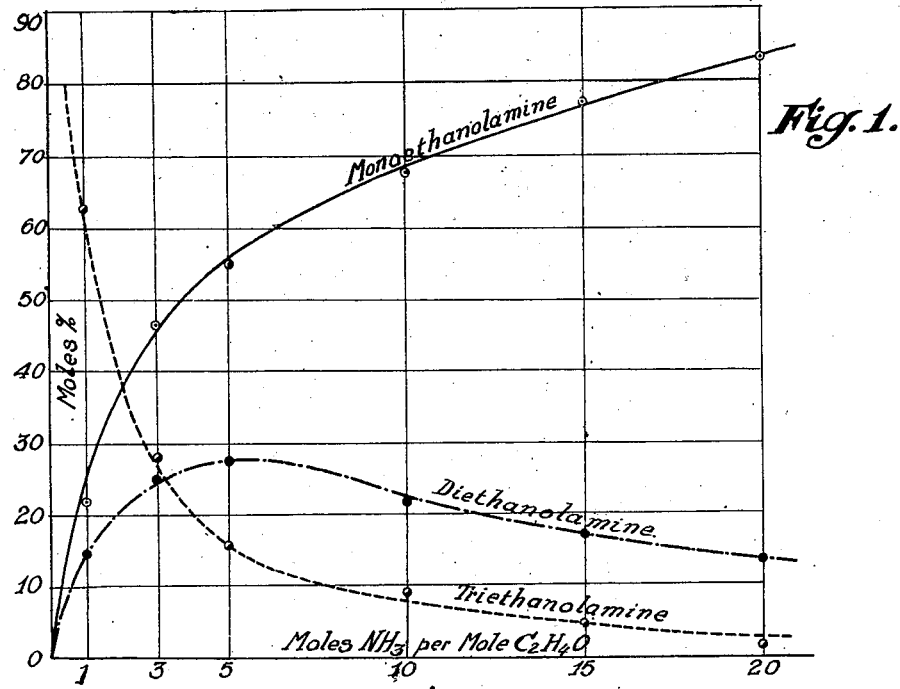

We have ascertained the percentage, at equilibrium, of the three amines: mono-, di- and triethanolamine, as a function of the ammonia/oxide molar ratio used; the curves in Fig. 1 of the accompanying drawing represent these results expressed in moles per cent at a temperature of 15° C.

For an ammonia/oxide molar ratio of 5/1 for example, we obtain at a concentration of about 11% a mixture of amines having a molar composition of 57% mono-, 28% di- and 15% triethanolamine, that is in weight 40% mono-, 34% di- and 26% triethanolamine.

It is under these operative conditions that the amount of diethanolamine formed is highest, although it still remains comparatively small.

Now diethanolamine is important as a starting material for the preparation of various products. It is therefore desirable to try to increase the production of secondary amine from the ethylene oxide used.

In our co-pending application Serial No. 757,318 filed June 26, 1947, for "Process for the preparation of alkanolamines" we have described that it is possible to suppress the formation of the secondary amine in favor of the tertiary amine by adding to the reactants used a definite quantity of secondary amine.

We now have investigated whether it is possible likewise to increase the production of the secondary amine by acting so as to suppress the formation of primary amine by adding to the reactants present a definite quantity of said primary amine.

If to the reactive ammonia-oxide mixture there is added a quantity of mono-ethanolamine equal to that forming at equilibrium under fixed conditions of excess of ammonia, i. e. 0.25 mole of monoethanolamine for a molar ammonia/oxide ratio of 3/1, 0.35 mole of monoethanolamine for a ratio of 5/1 and 0.50 mole of monoethanolamine for a ratio of 10/1, these quantities being expressed in relation to the mole of oxide present (Fig. 2, curve $a$) one again finds, at the end of the operation, 11, 18 and 35 grs. respectively of monoethanolamine for 100 grs. of amines formed under the above mentioned operating conditions.

Figure 2:
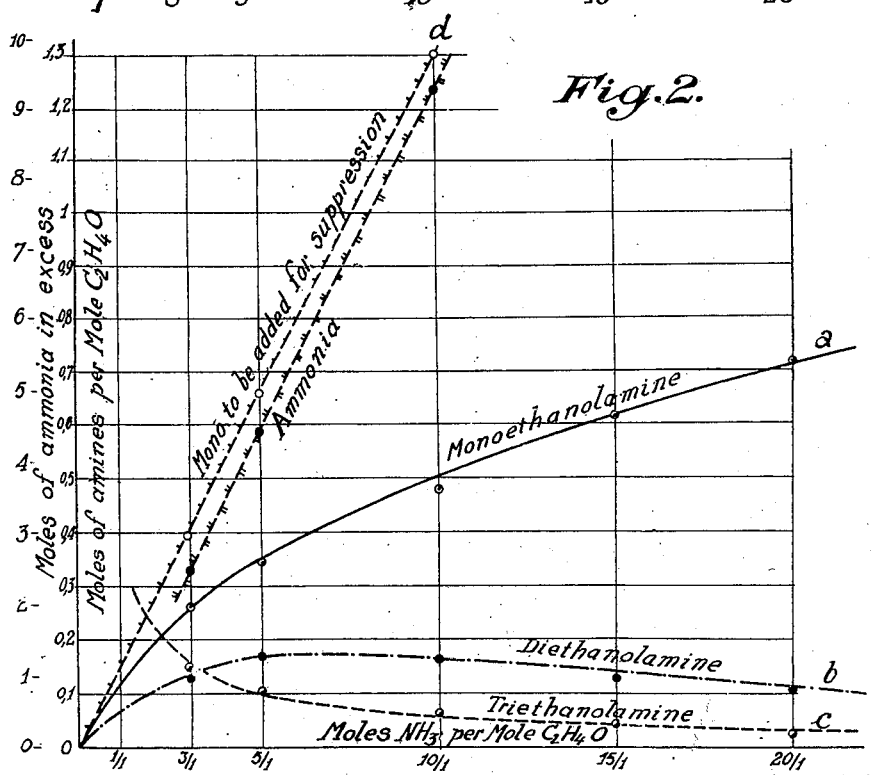

It is thus ascertained that here also these quantities of monoethanolamine are not sufficient to suppress any formation of primary amine. Indeed it is only by using 0.39, 0.65 and 1.3 moles of monoethanolamine, for molar ammonia/oxide ratios of 3/1, 5/1 and 10/1 respectively, that the oxide introduced is transformed solely into di- and triethanolamines (Fig. 2, curve $d$).

Similar results are obtained with propylene oxide or with higher olefine oxides.

In our aforesaid application No. 757,318 we have stated that the quantity of diethanolamine to be added to the reacting mixture, in order to suppress any formation of diethanolamine, is in relation, not with the quantity corresponding to equilibrium, but with the quantity of monoethanolamine which forms at equilibrium.

It has now been found that the same surprising fact takes place here: the quantity of monoethanolamine to be added to the reacting mixture, in order to suppress any formation of monoethanolamine, is not related to the quantity corresponding to equilibrium, but to the quantity of ammonia used.

By using quantities of monoethanolamine higher than those mentioned above, the oxide is also transformed only into di- and triethanolamines and moreover in this case, part of the monoethanolamine added is also transformed into di- and triethanolamines.

The present invention thus provides, in a process for preparing mixtures of di- and triethanolamines from ethylene oxide and ammonia in aqueous solution, without formation of monoethanolamine, by previously adding to the reactants a predetermined quantity of monoethanolamine in relation to the excess of ammonia used.

We have proved experimentally that the factor of proportionality between the mean monoethanolamine concentration, which it is necessary to obtain by previous addition of said amine in order to suppress its formation, and the mean ammonia concentration, is the ratio of the constants of the speed of reaction of ethylene oxide with ammonia on the one hand, and with monoethanolamine on the other hand.

Another method of carrying out the present invention consists in previously adding an excess of monoethanolamine as compared to the quantity corresponding to the suppression of its formation, so as to transform this excess into di- and triethanolamines, the final mixture of amines formed comprising only di- and triethanolamines.

*Example 1*

Into the reaction apparatus maintained at 15° C. there is continuously introduced, per hour, on the one hand 44 parts (by weight) of ethylene oxide and on the other hand 235 parts of ammoniacal solution having a density of 0.92 to which are added 24 parts of monoethanolamine. The product of the reaction is continuously drawn off.

After elimination of the excess ammonia and the water, the composition of the ethanolamines formed, apart from the monoethanolamine initially present, is 45 parts of diethanolamine for 55 parts of triethanolamine.

*Example 2*

Into the reaction apparatus maintained at 15° C., there is continuously introduced, per hour, on the one hand 44 parts of ethylene oxide and on the other hand 390 parts of ammoniacal solution of 0.92 density to which are added 40 parts of monoethanolamine. The product of the reaction is continuously drawn off.

After elimination of the excess ammonia and the water, the composition of the ethanolamines formed, apart from the monoethanolamine initially present, is 60 parts of diethanolamine for 40 parts of triethanolamine.

*Example 3*

Into the reaction apparatus maintained at 15° C., there is continuously introduced, per hour, on the one hand 44 parts of ethylene oxide and on the other hand 780 parts of ammoniacal solution of 0.92 density to which are added 80 parts of monoethanolamine. The product of the reaction is continuously drawn off.

After elimination of the excess ammonia and the water, the composition of the ethanolamines formed, apart from the monoethanolamine initially present, is 75 parts of diethanolamine for 25 parts of triethanolamine.

*Example 4*

Into the reaction apparatus maintained at 15° C., there is continuously introduced, per hour, on the one hand 44 parts of ethylene oxide and on the other hand 390 parts of ammoniacal solution of 0.92 density to which are added 50 parts of monoethanolamine. The product of the reaction is continuously drawn off.

After elimination of the excess ammonia and the water, the composition of the ethanolamines formed is 58 parts of diethanolamine and 42 parts of triethanolamine. In this case the whole of the initially added monoethanolamine is not recovered, a part thereof being converted into di- and triethanolamines.

These examples clearly illustrate the advantages of the process in accordance with the present invention.

This process offers a remarkable flexibility in working; in fact it makes possible the preparation of ethanolamines.

1. Without formation of monoethanolamine, with the production of variable proportions of di- and triethanolamines as a function of the molecular ammonia/oxide ratio used:

With a 3/1 ratio: 45% di- and 55% triethanolamine,

With a 5/1 ratio: 60% di- and 40% triethanolamine,

With a 10/1 ratio: 75% di- and 25% triethanolmine;

2. With consumption of monoethanolamine, by adding a quantity of monoethanolamine in excess as compared with that which suppresses its formation, this excess being converted during the operation into di- and triethanolamines.

These advantages are associated with a particularly simple method of operation.

The invention is obviously not limited to the foregoing examples; it is applicable whatever may be the molar ratio of ammonia/oxide and the concentration of ammonia in the solution, and whether operated at the temperature indicated or at lower or higher temperatures, at atmospheric pressure or at higher pressures, in a continuous or discontinuous process.

The various embodiments described with reference to the foregoing examples are likewise applicable, within the scope of the invention, to the use of propylene oxide or higher olefine oxides having as its purpose suppressing the formation of the primary amine. By higher olefine oxides are to be understood, in the present specification, the oxides of olefines capable of reacting with ammonia.

We claim:

1. In the production of alkanolamines by the reaction of a low molecular alkylene oxide and aqueous ammonia in any specific molar ratio and under any specific reaction condition, wherein the proportions of mono-, di-, and tri-alkanolamines produced are dependent upon the molar ratios of the reactants and the reaction conditions used, the improvement which comprises reacting the low molecular alkylene oxide and the aqueous ammonia in the presence of an addition of a quantity of the mono-alkanolamine produced by said reaction in excess of the molar amount which would be produced by reaction between said reactants under said specific molar ratio and reaction conditions when no such addition is made.

2. In the production of alkanolamines by the reaction of a low molecular alkylene oxide and aqueous ammonia in any specific molar ratio and under any specific reaction condition, wherein mono-, di-, and tri-alkanolamines are normally produced in proportions dependent upon the molar ratios of the reactants and the reaction conditions used, the improvement which comprises reacting the low molecular alkylene oxide and the aqueous ammonia in the presence of an addition of a quantity of the mono-alkanolamine produced by said reaction which causes the formation of substantially only di-alkanolamine and tri-alkanolamine under said specific molar ratio and reaction conditions.

3. In the production of ethanolamines by the reaction of ethylene oxide and aqueous ammonia in any specific molar ratio and under any specific reaction condition, wherein the proportions of mono-, di-, and tri-ethanolamines produced are dependent upon the molar ratios of the reactants and the reaction conditions used, the improvement which comprises reacting ethylene oxide and the aqueous ammonia in the presence of an addition of a quantity of mono-ethanolamine in excess of the molar amount which would be produced by reaction between said reactants under said specific molar ratio and reaction conditions when no such addition is made.

4. In the production of ethanolamines by the reaction of ethylene oxide and aqueous ammonia in any specific molar ratio and under any specific reaction condition, wherein mono-, di-, and tri-ethanolamines are normally produced in proportions dependent upon the molar ratios of the reactants and the reaction conditions used, the improvement which comprises reacting ethylene oxide and the aqueous ammonia in the presence of an addition of a quantity of mono-ethanolamine which causes the formation of substantially only di-ethanolamine and tri-ethanolamine under said specific molar ratio and reaction conditions.

5. In the production of ethanolamines by the reaction of ethylene oxide and ammonia in varying molar ratios in an aqueous solution as represented by Figure 2 of the appended drawing, the improvement which comprises adding to said reactants monoethanolamine in excess of a molar amount represented by curve $a$ in said figure.

6. In the production of ethanolamines by the reaction of ethylene oxide and ammonia in varying molar ratios in an aqueous solution as represented by Figure 2 of the appended drawing, the improvement which comprises adding to said reactants monoethanolamine in an amount at least approximately equalling the molar amount represented by curve $d$ in said figure.

PAUL FERRERO.
FRANÇOIS BERBÉ.
LEON RENÉ FLAMME.

REFERENCES CITED

The following references are of record in the file of this patent:

UNITED STATES PATENTS

| Number | Name | Date |
|---|---|---|
| Re. 19,632 | Arnold | July 9, 1935 |
| 1,904,013 | Reide et al. | Apr. 18, 1933 |
| 1,988,225 | Wickert | Jan. 15, 1935 |
| 2,051,486 | Kautter | Aug. 18, 1936 |
| 2,092,431 | Swallen et al. | Sept. 7, 1937 |
| 2,373,199 | Schwoegler et al. | Apr. 10, 1945 |
| 2,392,158 | Lucey | Jan. 1, 1946 |

FOREIGN PATENTS

| Number | Country | Date |
|---|---|---|
| 477,938 | Great Britain | Jan. 10, 1938 |

OTHER REFERENCES

Parkes, G. D., et al.: "Mellor's Modern Inorganic Chemistry," (Longmans, Green and Co., 1946), pp. 213 to 217, incl.